April 14, 1936.  W. R. GRISWOLD  2,037,074
TRANSMISSION MECHANISM
Filed Nov. 27, 1933
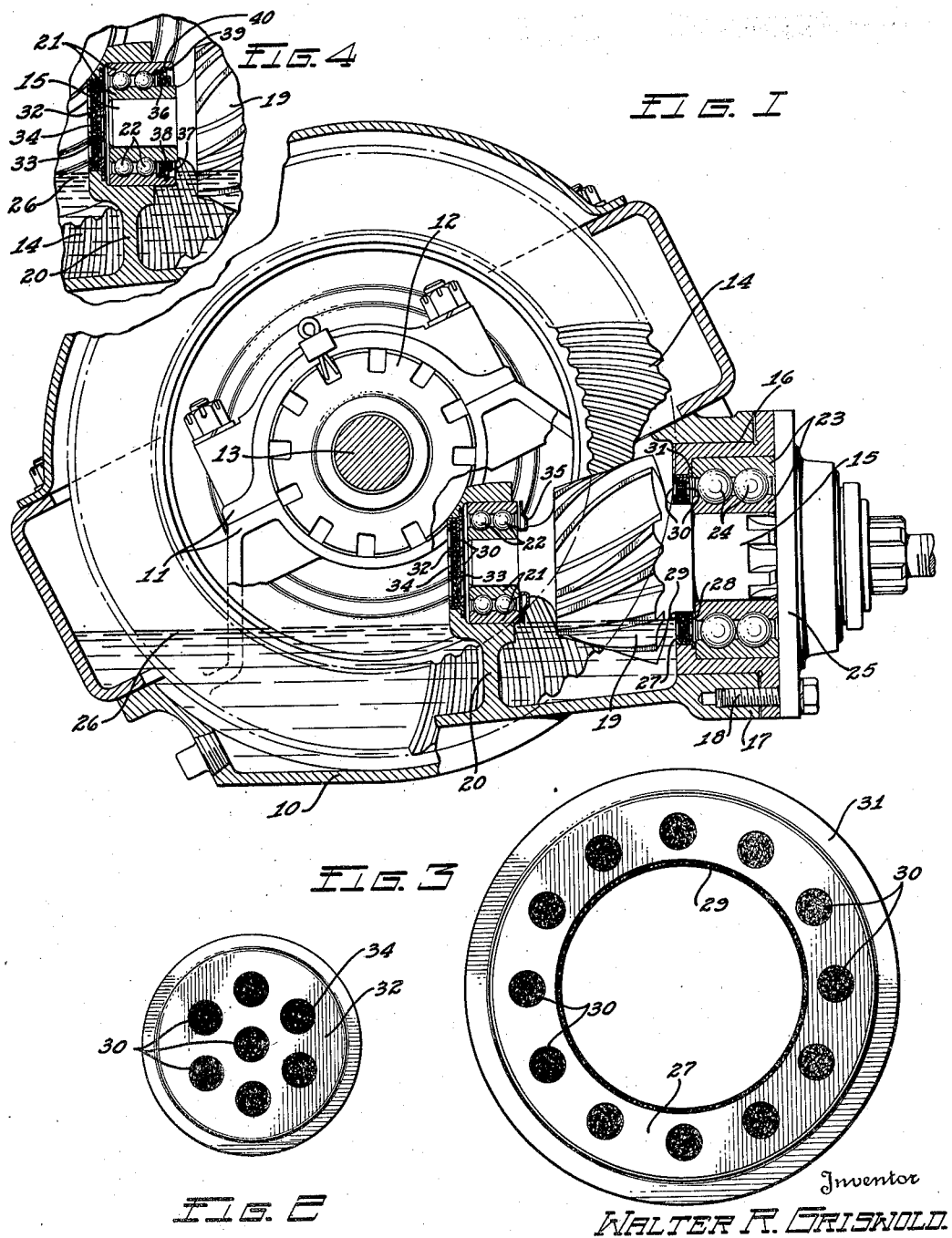
Inventor
WALTER R. GRISWOLD.
By
Attorney Patented Apr. 14, 1936

2,037,074

UNITED STATES PATENT OFFICE 2,037,074

TRANSMISSION MECHANISM

Walter R. Griswold, Detroit, Mich., assignor to Packard Motor Car Company, Detroit, Mich., a corporation of Michigan Application November 27, 1933, Serial No. 699,846

6 Claims. (Cl. 308—187)

This invention relates to power transmission mechanism and more particularly to means for protecting the bearings in transmission mechanism.

With some types of gearing, it is customary to reduce the friction between the meshing teeth by partially submerging one of the gears in oil carried in the casing. Heavily loaded gears, such as hypoid gears, have a contacting relation which in addition to the pressure tends to displace the oil film from the teeth during their initial contact so that inadequate lubrication results.

As a means of overcoming this lubricant displacement condition from the gear teeth, it is customary to combine with the usual petroleum base of lubricating fluids substances which increase the adhesive characteristics thereof, for example, a lead soap with a stabilizer, such as sulphur. Such additional substances and foreign substances in the fluid have a slow abrasive action on the bearings and they are therefore objectionable.

An object of this invention is to provide bearing protecting means through which lubricating fluid must pass and be filtered in passing to the bearing cavity so that substances foreign to the petroleum base will be excluded.

Another object of the invention is to provide a filter means for a gearing bearing which will prevent abrasive material in the lubricant from entering the bearing cavity.

Still another object of the invention is to prolong the life of bearings for transmission gearing through the provision of means which permits only filtered oil to enter the cavities of the bearings.

Other objects will appear from the following description taken in connection with the drawing, which forms a part of this specification, and in which:

Fig. 1 is a vertical sectional view of a power transmission mechanism having my invention associated with the bearings;

Fig. 2 is an end elevational view of one of the filtering means detached from its associated bearing;

Fig. 3 is an end elevational view of another filtering means detached from its bearing;

Fig. 4 is a fragmentary vertical sectional view of the power transmission mechanism having a modified form of my invention associated therewith;

In describing the invention, reference will be made to the drawing in which the invention has been illustrated as associated with bearings for the power transmission mechanism of motor vehicles. It will nevertheless be understood that no restriction of the invention is thereby contemplated since it is apparent that the invention is equally applicable to bearings for general use.

Referring now to the drawing by characters of reference, 10 represents a transmission housing which contains the driven rear axle structure of a motor vehicle. Carried within such housing by a sectional support, as indicated at 11, is a cage 12 for supporting the differential mechanism arranged to drive the rear axles of the vehicle, one of which is indicated at 13. Fixed to rotate with the cage of the differential mechanism is a ring gear 14 having teeth of the hypoid type.

A pinion shaft 15 extends through the bearing sleeve 16 into the interior of the housing, such sleeve being suitably fitted into a neck 17 of the housing and secured in position by bolts, as indicated at 18. The pinion 19 fixed to or forming a part of the shaft 15 lies within the housing, the teeth of this pinion being of the hypoid type and engaging with a hypoid ring gear. Within the housing is formed a supporting member 20 having a two diameter opening therethrough, the larger end of the opening being adapted to receive the rear end of the pinion shaft and a surrounding bearing. This bearing consists of a pair of spaced telescoping race rings 21 forming a cavity in which two series of balls 22 are arranged, such bearing being of a conventional design. Another bearing is arranged to surround the pinion shaft which fits within the forward end of the sleeve 16. This bearing also consists of a pair of spaced telescoping race rings 23 between which there is a bearing cavity containing two series of balls 24. The forward end of the bearing cavity between the rings 23 is sealed by a closure plate 25 which is held against the flanged forward end of the sleeve 16 by the bolts 18.

It will be understood that the structure so far described is of a conventional design and that the pinion shaft is driven from a suitable power plant in the usual manner. In order to lubricate the bearings and the hypoid gears, the gears are partially submerged in a pool of lubricating fluid contained in the housing, as indicated at 26. A lubricating film will remain on the teeth of the hypoid gears after leaving the pool of fluid sufficient to lubricate the same while in mesh. This lubricating fluid comprises a petroleum base to which is added a substance, such as lead soap, which improves the adhesive qualities thereof and there is also added a stabilizer substance of some form, such as sulphur. As above pointed out, the lead soap has a slow abrasive effect on the races and balls of the bearings when permitted to enter the cavities.

It is the main purpose of this invention to provide bearing protecting means which will prevent substances foreign to the petroleum base from entering the bearing cavities. To this end, I provide a filtering means at the rear end of the bearing cavities and sealing means for the front ends of the bearing cavities. The forward filter device consists of metal shells 27 and 28 which are flanged and assembled together in telescoping inverted relation to provide an enclosure for a felt ring 29. These rings are provided with a central opening of slightly larger diameter than the pinion shaft 15 which the device encircles and the felt ring is designed to bear against the shaft. A plurality of openings 30 are provided in the shells to permit lubricant to pass therethrough in order to enter the cavity between the bearing rings 23. The outer shell is formed with a radial flange 31 which engages a shoulder within the sleeve 16 and is held thereagainst by the outer race ring 23 when it is secured in position by the member 25. The diameter of the filter device is such that it fits snugly within the smaller portion of the opening through the sleeve 16. As the plate 25 seals the forward end of this bearing cavity, the only way in which lubricant can reach the cavity is through the openings 30 in the shell and the filter ring. It will thus be evident that any foreign substances in the lubricating fluid as well as the lead soap will be restrained from entering this bearing cavity and thus only the petroleum base, which has no abrasive quality, will serve as the lubricant for the bearing.

A somewhat similar filtering device is associated with the rear end of the bearing rings 21. This device consists of shells 32 and 33 which are telescoped in inverted relation to enclose a felt disc filter member 34. These shells are also formed with openings 30 in order that lubricant can pass therethrough and be filtered by the felt in traveling to the cavity between the bearing rings 21. This filtering device is of a diameter corresponding closely to the diameter of the smaller portion of the opening through the supporting member 20 so that it will be self retaining when pressed therein. This device will strain the lubricant passing therethrough so that the foreign material and the lead soap in the lubricating fluid will not enter the cavity between the bearing rings 21. Lubricating fluid will be thrown against the filtering devices by the rotating transmission elements so that sufficient oil will pass therethrough to adequately lubricate the bearings.

As shown in Fig. 1, the level of the lubricating fluid is slightly below the bearing cavity between the rings 21 and an oil throwing ring 35, associated with the pinion shaft in a relation adjacent the forward end of the cavity, will serve to substantially prevent lubricating fluid from entering the forward end of the cavity. Thus, substantially all of the lubricating fluid which enters the cavity between the bearing rings 21 must travel through the felt disc 34 so that it is filtered. It will thus be seen that the bearings are adequately supplied with the petroleum base of the fluid for lubricating purposes and that the substances in the lubricating fluid having a slow abrasive quality will not enter the cavities of the bearings.

In Fig. 4, I have shown a slightly modified form of means for protecting the rear bearing from the abrasive effect of any substance which might be in the lubricating fluid. This modified form of the invention is more advantageous when the level of the lubricating fluid in the housing extends above the inner diameter of the outer bearing ring 21. Instead of employing the oil throwing ring 35 previously described, which is spaced from the end of the bearing ring 21, I propose in this instance to employ means for sealing the forward end of the cavity between the bearing rings so that there will be no oil flow therethrough. The oil which enters the bearing cavity in this instance can only enter through the straining device adjacent the rear end of the cavity. As one means of sealing this forward end of the cavity, I provide a metal ring 36 which bears against the inner face of the outer ring and against the outer face of the inner ring. Associated with this ring is another angular ring 37 which forms therewith a housing for a felt ring 38 bearing against the shaft 15. Such sealing device is secured in position with the ring 36 against a shoulder formed in the outer bearing ring by a snap ring 39 which is adapted to be assembled in a groove 40 formed in the outer bearing ring. It will thus be seen that the level of the lubricating fluid in the housing can be well above the lower portion of the rear bearing without entering the bearing cavity unless filtered to remove any abrasive substances therein.

It will thus be seen that the bearing protecting means described herein permits the use of an adhesive lubricating fluid which will adhere to the teeth of meshing gears and at the same time lubricate the bearings without any abrasive effect thereupon.

Although the invention has been described in connection with specific embodiments, the principles involved are susceptible of numerous other applications which will readily occur to persons skilled in the art. The invention is therefore to be limited only as indicated by the scope of the appended claims.

What I claim is:

1. In a transmission mechanism adapted to run partially submerged in lubricating fluid having oil and lead soap therein, the combination with a shaft ball bearing having an open cavity therethrough, of oil throwing means preventing the passage of lubricating fluid into one end of the cavity and means straining the fluid lubricant entering the other end of the cavity, said straining means removing the lead soap from the lubricating fluid passing therethrough.

2. In a transmission mechanism adapted to run partly submerged in a lubricating fluid, the combination of a bearing having a pair of spaced telescoping ring race members and balls intermediate the rings, oil throwing means preventing the flow of oil into one end of the space between the race rings, and felt filtering means through which the oil must pass in moving into the other end of the space between the race rings.

3. In a transmission mechanism adapted to run partly submerged in a lubricating fluid containing lead soap, the combination of a shaft, a support, a bearing between the shaft and the support having a pair of spaced telescoping race rings and balls intermediate the rings, an oil thrower fixed to the shaft adjacent one end of the bearing rings for throwing oil away from the rings, and a filter means enclosing the other end of the bearing rings, said filter means removing the lead soap from the fluid passing therethrough to the bearing.

4. In a transmission mechanism, a casing adapted to contain a body of lubricating fluid having oil and an adhesive substance therein, a web in the casing having an opening therethrough, a bearing in the web, a bearing in the wall of the casing, a shaft extending through the bearing in the casing wall, the end of said shaft projecting into the bearing in the web, filter means enclosing the end of the bearing in the web beyond the shaft end, an oil thrower on the shaft at the other end of the bearing in the web, a gear on the shaft between the bearings projecting partially into the body of fluid, and filter means closing the inner end of the bearing in the casing, said filter means both being formed of material adapted to remove the adhesive substance from the lubricating fluid passing therethrough.

5. In a transmission mechanism, a casing wall having an opening therethrough of two dimensions, a shaft extending through the opening, a bearing in the larger diameter portion of the opening in the wall having ring races surrounding the shaft, an oil filter unit in the smaller diameter portion of the opening, said unit having a felt ring engaging the shaft and a metal container for the felt having a radial flange in the larger diameter portion of the opening at the inner end of and of larger diameter than the smaller diameter portion of the wall opening, and means securing the bearing rings axially in the opening with the inner end of the outer ring clamping the radial flange of the container against the casing.

6. In a transmission mechanism, a casing wall having a two diameter opening therethrough, shaft bearing means in the larger diameter portion of the wall opening, and an oil filter unit in the smaller diameter portion of the wall opening comprising telescoping metal shells enclosing a felt disc, one of said shells having a radially extending flange projecting peripherally beyond the remainder of the unit, said shells having perforations in the radially extending walls and a peripheral portion being press fitted into the wall opening.

WALTER R. GRISWOLD.